May 1, 1945.    C. E. BENNETT    2,375,067
ELECTRIC CABLE SHEATH
Filed Aug. 20, 1941    2 Sheets-Sheet 1

INVENTOR
Charles E. Bennett
BY
Liddle, Bevhill and Montgomery
ATTORNEYS.

May 1, 1945.  C. E. BENNETT  2,375,067
ELECTRIC CABLE SHEATH
Filed Aug. 20, 1941  2 Sheets-Sheet 2
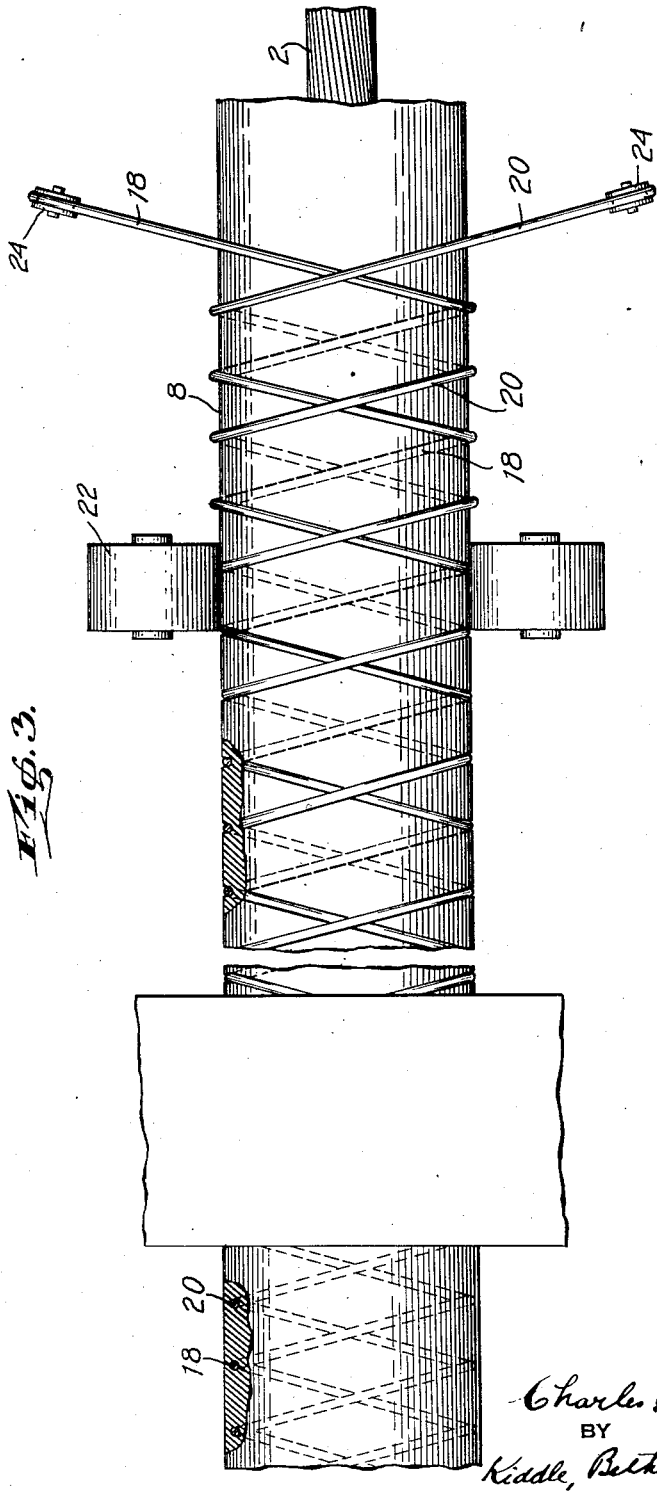

Patented May 1, 1945

2,375,067

UNITED STATES PATENT OFFICE 2,375,067

ELECTRIC CABLE SHEATH

Charles E. Bennett, Ridgewood, N. J., assignor to The Okonite-Callender Cable Company, Incorporated, Paterson, N. J., a corporation of New Jersey Application August 20, 1941, Serial No. 407,513

2 Claims. (Cl. 174—102)

This invention relates to an improvement in electric cable sheaths, and has for an object the provision of a sheath which possesses characteristics that overcome many of the difficulties inherent in sheaths as heretofore constructed.

It is well known that the vast majority of failures in lead sheath cables is due to the mechanical failure of the sheath. Cable sheaths as usually constructed are unable to withstand pressures which are in excess of 60 lbs. per sq. inch, and even at this pressure there is a tendency for cold flow which ultimately results in sheath failure.

It is extremely difficult commercially to make a sheath which is of uniform wall thickness, with the result that the sheath is eccentric and failure occurs at the thin areas.

In many types of cable applied pressures are present, as gas pressure in telephone cables, gas pressure power cables for high voltages, while in solid type oil impregnated cables deleterious pressures are often built up due to overloading.

To overcome these inherent difficulties it has been suggested to armor the cable by winding metal tape, for instance, or wire about the exterior of the sheath. This suggestion has the objection that it increases the overall dimensions of the cable, and, of course, where the installation is underground this reinforcement is exposed to corrosion.

My invention provides a construction which, while extremely simple, overcomes these inherent difficulties.

Broadly speaking, I propose to strengthen the sheath radially and at the same time impart elasticity to the same by embedding a very high tensile strength wire in the sheath. This wire is in a continuous length and applied helically with a short pitch. For example, in high tension cables where the wall thickness of the sheath is around ⅛" to ⁷⁄₆₄", I find a pitch of approximately ¼" to be satisfactory. In some cases I propose to reinforce the sheath longitudinally as well as radially by embedding two wires in the sheath in a basket weave effect.

In all cases the wire is embedded in the sheath and completely covered over so that there is no increase in the overall dimensions of the cable and no corrosion difficulties are to be contended with.

Various types of wire may be employed, but I have found steel wire, such as piano wire, of 26 or 32 gauge to be very satisfactory. In fact on tests I have had very remarkable results. This wire has a tensile strength of from 200,000 to 400,000 lbs. and on test I have subjected a length of sheath having such a wire embedded therein to internal pressures as high as 1100 lbs. per sq. inch without even distorting the sheath. This pressure was the maximum pressure which I could apply with the equipment available but it is my belief that I could have raised the pressure to double that employed without any bursting of the sheath. Of course even 1100 lbs. per sq. inch is a pressure in excess of pressures met with in actual cable practice. A sample of the same sheath, without the wire, burst at 250 lbs. pressure.

Because the ordinary lead sheath is inelastic, it is customary in oil impregnated cable practice to employ pressure devices or pressure relief devices which are of such a character that the impregnating fluid will at all times be under a positive pressure, these devices, however, preventing the building up of excessive pressures. This is to prevent the impregnating fluid from working out of the paper or other type of pervious insulation when the cable heats up and then failing to return to the insulation on the cooling cycle due to the inelasticity of the lead sheath; in other words, the sheath stretches but fails to return to its original form. My invention eliminates the necessity of such pressure control devices owing to the elasticity of the wire which is embedded in the sheath, and which will stretch when the pressures build up in the cable but will return to normal as the pressure is reduced.

In the accompanying drawings I have shown several embodiments of my invention.

Fig. 3 is a similar view of still another embodiment of the invention.

Figure 1:
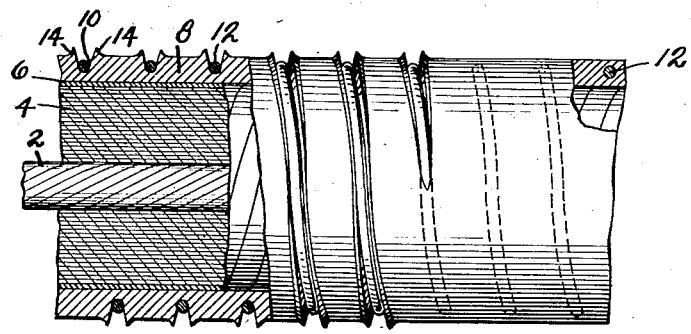
Fig. 1 is an elevational view in part section of one embodiment of the invention.

Referring first of all to Fig. 1 in detail: 2 designates an electric conductor, 4 insulation therefor which may take any form so far as my invention is concerned, but has been illustrated as laminated paper insulation, oil impregnated. 6 is the usual shielding tape, generally a copper tape a few mils in thickness and wrapped about the insulation 4 from one end of the cable to the other.

8 designates the cabel sheath. This sheath is the usual lead or lead alloy sheath universally employed in electric cable practice.

In the manufacture of the cable the insulated conductor is fed through a lead press where the sheath, such as 8, is extruded about the insulation. Under the present invention as the cable is passing through the press and the sheath is formed a spiral indentation or groove is formed in the sheath periphery, as shown at 10. In this embodiment of the invention no metal is removed from the sheath but the metal is simply displaced with any suitable tool to form the helical groove which I have designated 10. This groove, it is to be understood, extends continuously throughout the length of the sheath and its depth exceeds the diameter of the wire which is to be laid in it. The pitch of the helix is fairly short, preferably. In my experiments and tests I have employed a ¼" pitch with good results. However, I want it to be distinctly understood that such a pitch is purely by way of example inasmuch as the pitch may be shorter or longer than the distance mentioned. As the identation or groove 10 is being formed or subsequent thereto a steel wire 12 such as the piano wire above mentioned is laid in the bottom of the groove, and then the metal 14 which was displaced in forming the groove is rolled or swaged over upon the wire. The finished sheath is shown in section at the right hand end of Fig. 1, from which it will be seen that the exterior of the sheath is smooth and unbroken and that the wire 12 is completely embedded, the groove 10, as above noted, having been formed to a depth which exceeds the diameter of the wire 12.

Inasmuch as no metal has been removed in embedding the wire, and inasmuch as the wire itself, which while fairly small gauge, say 26 or 32, has a tensile strength of from 200,000 to 400,000 lbs. per sq. inch, the sheath is not weakened but has been tremendously strengthened mechanically radially of the sheath.

Figure 2:
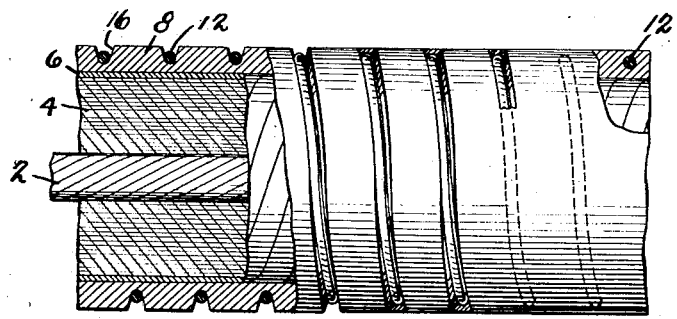
Fig. 2 is a similar view of another form.

In Fig. 2 I have shown a somewhat different embodiment of the invention, in that in this case the periphery of the sheath is grooved by removing metal therefrom. The groove, designated 16, extends helically of the sheath as before with a short pitch. Steel wire 12 is laid in this groove. Before the wire is applied it is preferably tinned. I then fill the groove 16 with solder or lead or other metal in a molten condition and then follow with a rolling, wiping or swaging tool. This action effects a slight hardening of the sheath surface above the wire so that there is no weakening of the sheath due to removal of metal in forming the groove 16. If desired, I may use a metal sprayer to fill the groove and cover the wire.

In the two embodiments of my invention so far described the sheath has been strengthened radially, but in the form illustrated in Fig. 3 the sheath is strengthened longitudinally as well as radially. In this embodiment of the invention I employ two wires 18 and 20 which are similar to the wire 12 of Fig. 1. They are laid about the exterior of the sheath helically and with a short pitch. They may be wound the same or opposite hands, but, in any event, must cross each other in somewhat of a basket weave design as illustrated. I then proceed to force them into the surface of the sheath with any suitable swaging tool or device as indicated diagrammatically at 22. As the swaging device forces the wires into the sheath a certain amount of excess wire will be accumulated which may be taken up by tension devices illustrated diagrammatically at 24.

Subsequent to this operation the sheath is passed through a bath of hard solder or lead to finish off the sheath periphery or the sheath may be metal sprayed.

In all forms of my invention it will be apparent that the wire is completely embedded in the sheath so that all danger of corrosion is avoided and so that there is no increase in the overall dimensions of the cable.

It will be appreciated also that inasmuch as the wire has such high tensile strength the sheath is tremendously strengthened radially, while in the embodiment of my invention last described it is greatly strengthened longitudinally as well.

In addition to the bursting tests above referred to, I have subjected my cable to the bend test commonly employed in the lead sheathed cable industry and found no distortion, in fact the reinforced sheath looked much better than ordinary lead samples do.

Another important characteristic present in all forms of my improved sheath is the elasticity of the sheath due to the presence of the reinforcing wire or wires embedded in the wall of the sheath and extending helically about the sheath axis. This is of great moment if high internal pressures should build up in the cable inasmuch as it will permit the pressure to be relieved, yet the sheath will restore itself—not remain permanently stretched—when the pressure drops.

While I have described my invention as applied to single conductor cables, it is to be understood of course that the invention is equally applicable to multi-conductor cables.

It is to be understood, furthermore, that changes may be made in the details of construction and arrangement of parts hereinabove described within the purview of my invention.

What I claim is:

1. An electric cable comprising an electric conductor insulated with oil impregnated insulation, an enclosing smooth surfaced lead sheath and a continuous length of elastic, high tensile strength wire extending helically of the sheath and completely embedded therein, the pitch at which the wire is laid and the elastic and tensile strength properties of the wire being such as to permit the sheath to expand under volumetric increase in the oil of the cable as the cable heats up due to its operation and to restore the sheath to its original dimensions as the oil of the cable cools down.

2. An electric cable comprising an electric conductor insulated with oil impregnated insulation, an enclosing smooth surfaced lead sheath, and a plurality of high tensile strength elastic wires extending helically of the sheath, said wires being completely embedded in the sheath and so laid as to cross each other, the pitch at which the wires are laid and their elastic and tensile strength properties being such as to permit the sheath to expand under volumetric increase in the oil of the cable as the cable heats up due to its operation and to restore the sheath to its original dimensions as the oil of the cable cools down.

CHARLES E. BENNETT.